June 8, 1926.
K. E. PEILER
MULTIPLE GLASS FEEDER
Filed March 31, 1921    2 Sheets-Sheet 1
1,587,986
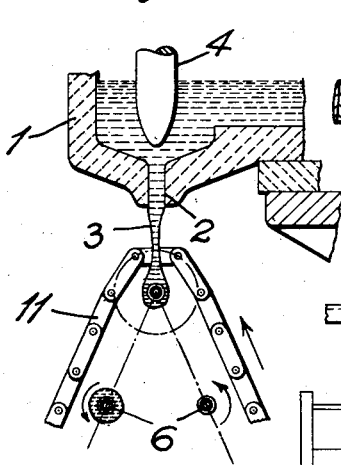
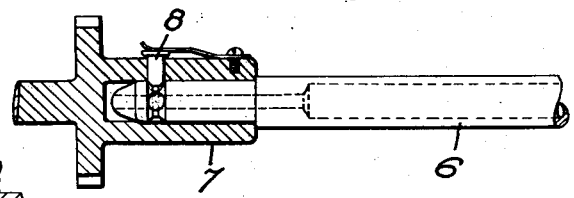
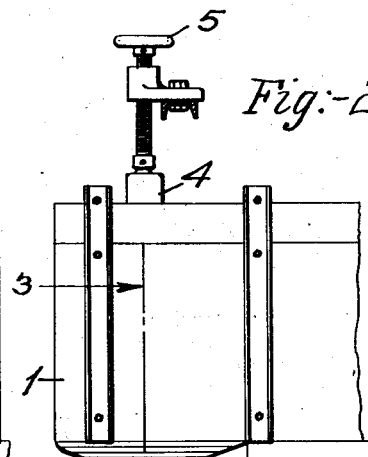
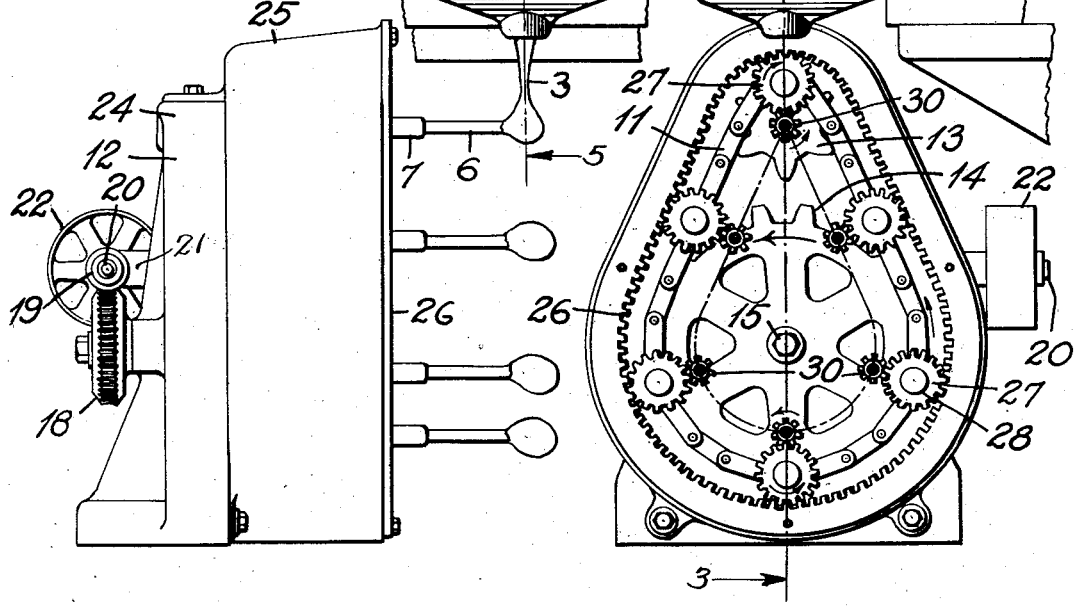
Witness
E. L. Jarvis
Inventor
Karl E. Peiler
by *H H Homiss*
Atty June 8, 1926.
K. E. PEILER
1,587,986
MULTIPLE GLASS FEEDER
Filed March 31, 1921    2 Sheets-Sheet 2
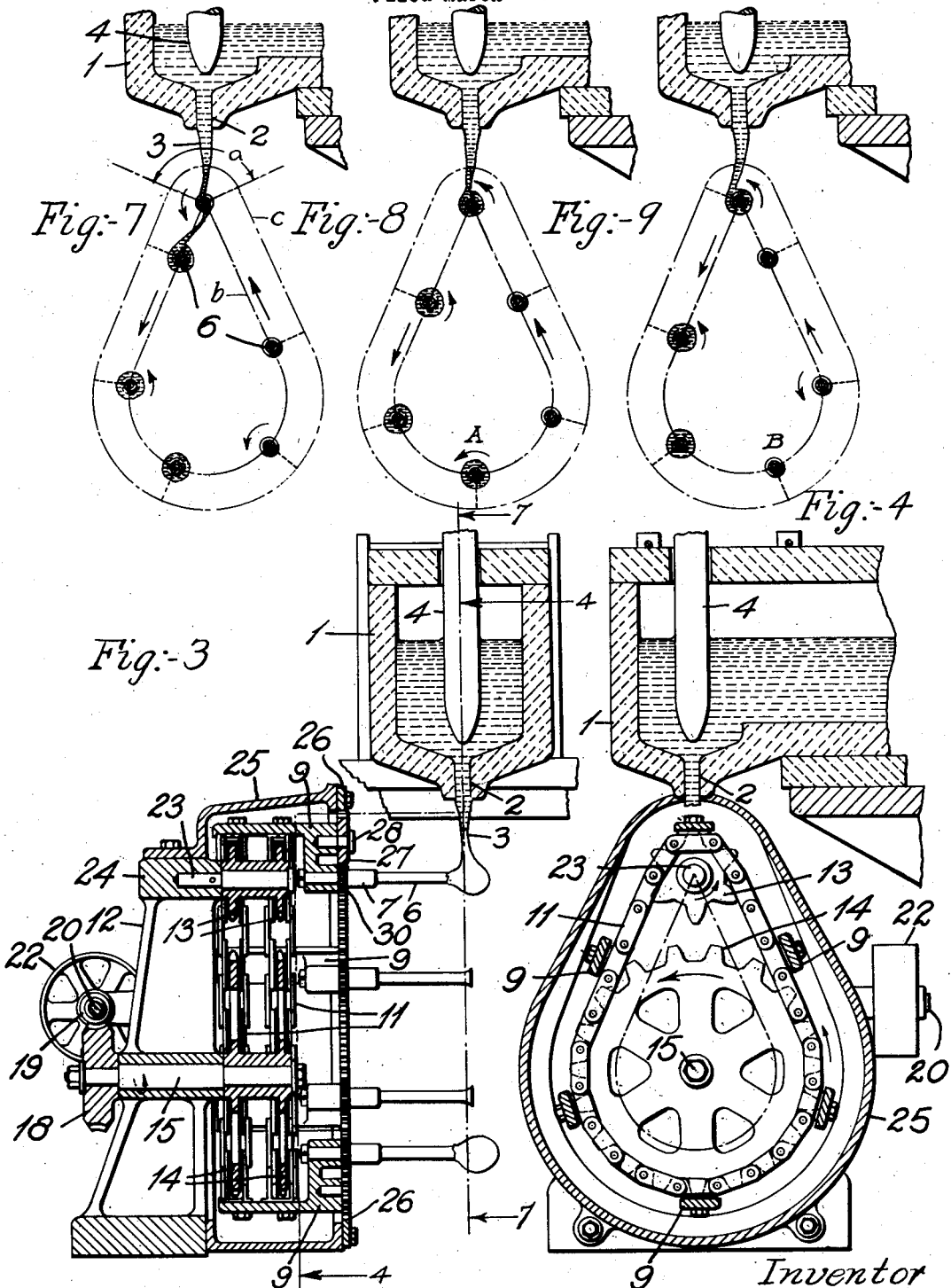
Witness
E. L. Jarvis.
Inventor
Karl E. Peiler
by W. H. Honiss
Atty Patented June 8, 1926.

1,587,986

UNITED STATES PATENT OFFICE.

KARL E. PEILER, OF WEST HARTFORD, CONNECTICUT, ASSIGNOR TO HARTFORD-EMPIRE COMPANY, OF HARTFORD, CONNECTICUT, A CORPORATION OF DELAWARE.

MULTIPLE GLASS FEEDER.

Application filed March 31, 1921. Serial No. 457,300.

This invention relates to a method of and apparatus for automatically gathering glass from a supply of molten metal.

The invention embodies among other things a plurality of gathering implements mounted for translatory movement upon a continuously traveling carrier which successively presents each of the implements to a supply of glass, arrests its translatory movement while obtaining a charge therefrom, moves it away from the supply to segregate its charge, at the same time bringing the next implement into gathering position, and then carries the first implement to a convenient position for removal, or for presentation of its gather to other mechanism for further treatment.

One object of this invention is to permit of successively arresting the translatory movement of the implements although the carrier moves continuously, and this is accomplished by arranging the parts so the orbits of the gathering implements pass through the axial center of one of the sprocket wheels around which the carrier passes, thus successively retarding and resuming the travel of each gathering implement in respect to the others.

Another object of this invention is to rotate the gathering devices continuously to accumulate gathers from the supply and maintain the gather so obtained on each implement in a compact mass.

The accompanying drawings, in connection with the following description, disclose a new method and a preferred apparatus for performing this new method, although various other forms of mechanical arrangements within the scope of the appended claims might be used.

Figure 1 is a side elevation of the invention shown in working relation to a stream of glass flowing from a suitable furnace.

Fig. 2 is an end elevation at right angles to Fig. 1.

Fig. 3 is a vertical longitudinal section through the machine on the line 3—3 of Fig. 2.

Fig. 4 is a transverse section on the line 4—4 of Fig. 3.

Fig. 5 is a detail sectional view on the line 5—5 of Fig. 1.

Fig. 6 is a detail view showing the manner of retaining the gathering implements in their chucks.

Figs. 7, 8 and 9 show diagrammatically the various positions assumed by the gathering implements immediately preceding, during and after gathering.

In the particular embodiment of the invention shown herein, the molten glass 3 flows, preferably in a stream, from an orifice 2 of a furnace 1, or other container, the rate of flow being controlled by a regulating gate or valve 4 through hand wheel 5.

The gathering devices comprise a plurality of punties or blow pipes 6, removably carried in chucks 7 by suitable retaining means 8, the chucks being rotatably mounted in carriers 9. These carriers are preferably linked together by two parallel sprocket chains 11, 11, disposed side by side, from which the chucks, with their gathering implements, project sidewise and describe a path or orbit $b$ which is at one side of the path of travel $c$ of the chains (Fig. 7).

To impart translatory movement to the gathering devices, the chains are driven continuously around two or more double sprocket wheels 13 and 14, through mechanism described below, by a pulley 22 or any other convenient means for rotating a shaft 20 mounted in bracket 21. A shaft 15, carried in suitable bearings in standard 12, supports sprocket wheel 14 and a worm wheel 18, the latter being driven by worm 19 on shaft 20. The sprocket wheel 13 is rotatably mounted on stud 23 fixed in boss 24 on standard 12, the diameter of sprocket wheel 13, and the location of its axis and of the longitudinal axes of the gathering implements being such that at times during the translatory movement of the latter their longitudinal axes are brought into coincidence with the axis of sprocket wheel 13 (see Figs. 2, 4 and 5), and remain there while their respective brackets 9 are turning around the sprocket 13 through the angle $a$ (Fig. 7), during which period the gathering implement reamins in the gathering position in the path of flow of the glass, and obtains its gather therefrom, although the carriers travel continuously.

In Fig. 7, with the carrier moving in the direction of the arrows, a charged implement is moving away from the gathering position and the succeeding implement has stopped in that position, owing to its being brought into line with the axis of sprocket wheel 13, where it remains for an appreciable period obtaining its gather, while its carrier 9 is passing around the sprocket. When the portion of chain supporting the bracket 9 leaves the periphery of wheel 13, the implement resumes its translatory motion, moving forward out of alignment with the axis of sprocket wheel 13 and resuming its original position relative to the preceding implement. Each succeeding implement is thus stopped in its orbit at the gathering position to obtain its gather and then resumes its translatory movement.

The gathering implements are continuously rotated on their longitudinal axes by the following mechanism. An idler gear 27 is rotatably secured to each carrier 9 by a pin 28, these idlers meshing with a stationary rack 26 on a guard 25, and with pinions 30, one of which is secured to each chuck 7, thereby transmitting a continuous rotation to the gathering implements from the continuous travel of chains 11, although the translatory movement of the gathering implements is interrupted during the gathering operation.

The gathers obtained on the implements are separated from the stream by the continuous rotation of the implements in conjunction with their separating movement, as illustrated diagrammatically in Fig. 7, in which the glass extending between two implements is being pulled apart, the resultant ends being wound on the respective implements, and thus absorbed into the respective gathers. Fig. 8 shows a gather partially accumulated by the continuous rotation of the implement in contact with the stream; and Fig. 9 shows the completely accumulated gather, the implement being ready to leave the path of the flowing stream and resume its translatory movement.

At any suitable point in the travel of the carrier after the gathering operation, as at A in Fig. 8, the gathering implements, with the gathers thereon, may be removed from the chucks, and presented to other mechanism for further treatment. Empty implements may be inserted at any position prior to the gathering position, as the point B in Fig. 9.

With the apparatus shown herein, variable sizes of gathers may be obtained by regulating the rate and volume of flow of the stream of glass 3, or by increasing or diminishing the rate of travel of the carriers.

It may sometimes be desirable to incline the axes of the gathering implements downwardly to maintain the gathered glass more evenly on the ends of the implements, and this may be accomplished in any convenient way, as by inclining standard 12 and thus inclining the translating and rotating mechanism as a whole.

The teeth of the rack 26 here shown as continuous may be interrupted at places to discontinue the rotations of the implements whenever desired, for removing them, or for other purposes, or friction rolls and frictional driving surfaces therefor may in some cases be substituted for the toothed gears and racks herein shown. The chains 11 may also pass over another sprocket of the diameter of the sprocket 13, so as to arrest the translatory movement of the implements at any desired removal point, with or without stopping their rotary movement.

I claim as my invention:—

1. The method of obtaining gathers of molten glass from a supply, which consists in winding the glass in succession upon a plurality of rotating gathering implements, and increasing the distance between the implements to pull their respective gathers apart.

2. The method of obtaining gathers of molten glass from a supply, which consists in winding the glass in succession upon a plurality of rotating gathering implements, and increasing the distance between the implements to pull their respective gathers apart, while continuing to rotate the implements.

3. The method of obtaining gathers or molten glass, which consists in flowing the glass in a stream onto a succession of rotating gathering implements, and separating the implements to pull the stream apart between them.

4. The method of obtaining gathers of molten glass, which consists in flowing the glass in a stream onto a succession of rotating gathering implements, and separating the implements while rotating them to pull the stream apart between them, and wind the resultant ends upon the respective implements.

5. The method of obtaining gathers of molten glass, which consists in flowing the glass in a stream, moving a gathering implement intermittently in an orbital path intersecting the stream by a carrier which arrests the orbital movement of the implement when the implement is at the point of said intersection by moving in an arc around said point, and gathering glass from the stream by rotation of said implement during said intermission.

6. In apparatus for feeding molten glass, the combination with a plurality of rotating gathering implements, of means for presenting said implements in succession to a supply of molten glass to obtain gathers therefrom, and means for separating the implements farther from each other to pull their respective gathers apart.

7. In apparatus for feeding molten glass, the combination with a plurality of gathering implements, of means for presenting these implements in succession to a supply of molten glass to obtain gathers therefrom, means for separating the implements farther from each other to pull their connecting cords of glass apart, and means for absorbing the cord ends into the respective gathers.

8. In apparatus for feeding molten glass, the combination with a plurality of gathering implements, of means for rotating these implements in succession in a supply of molten glass to obtain gathers therefrom, and means for separating the implements farther from each other to pull their respective gathers apart.

9. In apparatus for feeding molten glass, the combination with a plurality of rotating gathering implements, of means for presenting these implements in succession to a stream of molten glass to obtain gathers therefrom, and means for separating the implements to pull the stream apart between the successive gathers.

10. In apparatus for feeding molten glass, the combination with a plurality of gathering implements, of means for rotating said implements in succession in a stream of molten glass to obtain gathers therefrom, and means for separating the implements while rotating to pull the stream apart between the successive gathers and to absorb the resultant ends into the respective gathers.

11. In apparatus for feeding molten glass, the combination with means for producing a flowing stream of glass, of a carrier, a gathering implement mounted thereon, and means for moving the gathering implement in an orbital path intersecting the stream, said carrier having a greater arc of travel than said gathering implement at the point of intersection, whereby the orbital movement of the implement is interrupted in contact with the stream while the carrier is traversing the greater arc.

12. In apparatus for feeding molten glass, the combination with means for flowing the glass in a stream, of a plurality of gathering implements, means for supporting said implements, and means for continuously moving the supporting means to carry the implements into and out of contact with the stream of glass, and stop each implement while in said contact to accumulate gathers from the stream.

13. The combination of a traveling carrier, a gathering implement carried thereon and movable therewith into and out of contact with a stream of molten glass, and means for arresting the travel of the said implement while in contact with the molten glass relative to the travel of the carrier.

14. The combination of means for flowing a stream of molten glass, a traveling carrier, a gathering implement carried thereon and movable therewith into and out of contact with the flowing stream, means for arresting the travel of the said implement relative to its carrier while in contact with the stream, and means for rotating the implement to accumulate a gather thereon from the stream.

15. The combination of a traveling carrier, a gathering implement carried thereon and movable therewith into and out of contact with a stream of molten glass, and means for retarding and resuming the travel of the said implement while in contact with the molten glass, relative to the travel of the carrier.

16. The combination of a traveling carrier, a gathering implement mounted thereon, means for moving said implement into and out of the path of a stream of molten glass, and means for retarding and resuming the travel of the said implement while in contact with the molten glass, relative to the travel of the carrier.

17. The combination of a traveling carrier, a gathering implement mounted thereon, means for moving said implement across the path of a stream of molten glass, and means for arresting the implement in the path of the glass independently of the travel of the carrier.

18. The combination with a constantly moving carrier, of a plurality of rotating gathering implements carried thereby and movable therewith to collect gathers thereon from a supply of molten glass, and means for successively retarding and resuming the travel of each gathering implement with respect to the other implements while continually preserving its original position in respect to its carrier.

19. The combination of a traveling carrier, an implement carried thereby into and out of contact with a supply of molten glass to accumulate gathers therefrom, and means for guiding the carrier in an arc around the implement as an axis, while the implement is in contact with the supply to temporarily arrest the travel of the implement.

20. The combination of a traveling carrier, a plurality of gathering implements carried thereby into and out of contact with a supply of molten glass to accumulate gathers therefrom, means for guiding the carrier in an arc around the implement as an axis while the implement is in contact with the supply, to temporarily arrest the travel of the implement, and means for rotating the implement.

21. The combination of traveling carriers, a plurality of gathering implements carried thereby into and out of contact with a stream of molten glass to accumulate gathers therefrom, and means for causing the gathering implements to approach and recede from each other while adjacent to the stream, independently of the travel of the carriers.

22. The combination of traveling carriers, a plurality of gathering implements mounted thereon, means for guiding said implements across the path of a stream of molten glass to accumulate gathers therefrom, and means for causing the gathering implements to approach and recede from each other while obtaining their gathers independently of the travel of the carriers.

23. The combination with a carrier moving in a closed path, part of which is an arc, of a gathering implement so located on the carrier that it travels in an orbital path inside that of the carrier and passes through the axis of the arc, whereby the travel of the implement is arrested at said intersection while its carrier is moving about said axis.

24. The combination with a plurality of carriers movable in a closed path, part of which is an arc, a plurality of gathering implements carried thereby in an orbital path inside that of the carrier and passing through the axis of the arc, and means for flowing a stream of molten glass across the axis of the arc, whereby the travel of each of the implements is arrested at the intersection of the orbital path with the axis of the arc to enable the implement to gather glass from the stream.

25. The combination with a carrier moving in a closed path, part of which is an arc, of a gathering implement located on the carrier, and means for moving said carrier so as to bring the gathering implement into and out of proximity to a stream of molten glass flowing across the axis of said arc, whereby the movement of said gathering implement is arrested when coincident with said axis, independently of the movement of said carrier, to obtain a gather on the implement from the stream.

26. In apparatus for gathering molten glass from a stream, the combination of a plurality of gathering implements, constantly moving means for supporting said implements, and means for imparting to the implements an intermittent translatory movement across the stream and a continuous rotary movement.

27. The combination with a traveling carrier, of a revoluble gathering implement carried thereby, means for moving the said carrier with said gathering implement thereon to present the latter to a supply of molten glass, and driving means actuated by the travel of the carrier for rotating said implement to collect and retain a gather of glass thereon.

28. The combination of a stationary frame, a carrier having a movement in respect to said frame, a gathering implement carried by said carrier for presentation to a supply of molten glass, and gearing actuated by the movement of said carrier in respect to said frame for causing a rotation of the implement to collect and retain a gather of glass thereon.

29. The combination with a supply of molten glass, of moving carriers, revoluble gathering implements carried thereby, means for moving said carrier to intermittently and successively position said gathering implements at said supply, and driving means operated by said movement of said carrier to rotate said implements to collect and retain gathers of glass thereon.

30. The combination of a stationary frame, a plurality of gathering implements, movable carriers adapted to carry the gathering implements into and out of contact with a supply of molten glass, and driving means actuated by the movement of said carrier in respect to said frame for causing a rotary movement of the implements to collect and retain gathers of glass thereon.

Signed at Hartford, Conn., this 28th day of March, 1921.

KARL E. PEILER.